Patented Apr. 26, 1932

1,855,674

UNITED STATES PATENT OFFICE

CHARLES HINDE, OF LONG BEACH, CALIFORNIA

PROCESS OF DISPOSING OF ACID WASTE

No Drawing.  Application filed September 29, 1930.  Serial No. 485,301.

My invention relates to the novel process of burning, decomposing and disposing to the atmosphere of acid wastes containing sulphuric or sulphur acids, either with or without carbonaceous or combustible portions. An object of the invention is to so treat the material to the action of a decomposing heat and required air within a chamber preferably entirely devoid of exposed metal so as to cause (1) Evaporation of the water from the acids;

(2) Decomposition of the acids by the presence of carbonaceous or combustible portions contained in the materials;

(3) decomposition of the sulphur trioxide to sulphur dioxide, oxygen and other gases;

(4) Consumption of remaining carbonaceous portions and oxygen contained in the material;

(5) Retaining the final gases in a hot state and at a practicable temperature to substantially prevent return conversion of the sulphur dioxide to sulphur trioxide, while preferably out of contact with metal, and to assist diffusion in the atmosphere; and finally (6) Causing prompt dissipation into the atmosphere of the gases while they are in the last mentioned heated condition.

Under certain conditions, I find that acid wastes may be satisfactorily treated in the above referred to manner so that the gases on being discharged to the atmosphere will be in a hot reduced chemical form where they will be freely dissipated and prevented from descending to the earth in the form of objectionable gases. According to other conditions, I find that satisfactory results can be obtained by subjecting the material to the action of necessary heat and air within a decomposing chamber so as to substantially effect complete decomposition of the materials to sulphur dioxide, carbon dioxide and steam, and by diluting the gases with a suitable medium to reduce the proportion of the sulphur dioxide either by utilizing the combustible matter inherent in the material or combustible matter that may be associated with the material or otherwise added thereto, before they are discharged from the chamber, then maintaining the diluted gases at a practicable temperature to prevent return conversion of the low proportions of sulphur dioxide to sulphur trioxide, and the gases may, at this time, be immediately dissipated into the atmosphere in a form and condition that will not give rise to noxious odors nor be injurious to vegetation.

In practice, I may employ a furnace of any well-known or conventional construction having a decomposing chamber, with a suitable burner for supplying sufficient heat to effect decomposition of the sulphur and any carbonaceous portions and cause sulphur dioxide and other gases to be formed. I deem it desirable, in addition to providing such furnace with means to permit controlled portions of air to enter the decomposing chamber that may be necessary for combustion, to provide means preferably at the front of the furnace whereby a forced draft may be created that will enable the operator to control the velocity of the gases discharging from the stack of the furnace. Also I deem it necessary to provide a furnace which will be constructed of firebrick and which will preferably be devoid of metal that could possibly be brought into contact with the gases either in the decomposing or incinerating chamber or in the stack. The burner which is recommended to be employed is of the type whereby suitable portions of fuel and air can be supplied thereto in order to create within the decomposing or incinerating chamber a heat fully commensurate with the quantity and nature of the material being handled; that is to say, in cases where the acid and water content in the material is high, I would increase the intensity of the flame at the burner because in such case the percentage of carbonaceous portions contained in the material is low, whereas in those cases where the acid and water content is relatively low, the intensity of the flame would be controlled accordingly. This is because I am able to rely very largely upon the combustible matter contained in the material under treatment. These various materials can be successfully decomposed within the chamber of the furnace when subjected to heats ranging between 1600° F. and 2200° F.

I have discovered that according to certain conditions of the materials under treatment, same can be satisfactorily decomposed within a furnace chamber of the aforementioned type and that if the gases are held at a temperature sufficient to prevent the return conversion of sulphur dioxide to sulphur trioxide, they may be immediately dissipated into the air in such form as will not give rise to noxious odors nor be injurious to life or vegetation. The furnace is preferably one employing a stack constructed of firebrick and devoid of metal throughout that passage in the stack through which the gases are impelled. Such stack should best be in the neighborhood of one hundred fifty feet in height, and the temperature of the heat which I propose to maintain in the stack is such as will prevent return conversion of the gases. I have found that a temperature of approximately 1600° F., or as near thereto as practicable with permissible small amounts of sulphur trioxide, is entirely suitable for this purpose. I also find that by controlling the velocity of the gases at the discharge end of the stack, the gases can be effectively dissipated to the atmosphere in a manner that will suit the ends in view.

In those instances where it is desired to dilute the gases before same are allowed to leave the decomposing or incinerating chamber of the furnace, this step can be satisfactorily accomplished in a variety of ways, among which may be included introducing a supplementary heating medium within the chamber at any point or points therein; producing an excess of carbon dioxide in the chamber sufficient to reduce the sulphur proportions; burning or decomposing other materials such as carbonaceous matter or the like within the chamber which will result in a high enough dilution of the sulphur gases by the presence of carbon dioxide, nitrogen and other gases so as to produce the desired low proportions of the sulphur gases before permitting same to leave the chamber, introducing to or producing within the chamber combustible or inert gases; admitting an excess of air to the chamber either before or during the decomposition and in proportion greater than required for ordinary combustion purposes, which said air preferably is preheated.

The form of furnace which I have herein recommended to be used in practicing the invention is one whose stack has no draft openings at the bottom such as those described in my Letters Patent of the United States No. 1,776,070, dated September 16, 1930. This is for the reason that in the present embodiment of my invention no atmospheric air is admitted into the stack. According to one specific embodiment of my invention as herein set forth, I propose to dilute the gases, but in a broader embodiment I do not dilute the gases but rely upon maintaining the gases at a certain temperature after they leave the decomposing chamber so that they will not be reconverted on their passage through the stack. In the more specific embodiment of my invention, I rely entirely upon diluting the gases within the chamber and before the gases are admitted to the stack, then maintaining that temperature within the stack that will prevent reconversion of the gases. Here it should be noted, however, that in lieu of combining a diluting medium with the gases in the chamber, the necessary step of diluting the gases can be carried on entirely within the stack. This I can do in substantially the same manner as I have described elsewhere herein for diluting the gases within the chamber. When the gases are diluted within the stack instead of within the chamber, care is exercised that the gases are maintained at a temperature to prevent reconversion on their passage from the chamber to the stack and that a temperature is maintained in the stack that, as far as practicable, will not cause the sulphur gases to be reconverted.

While the process is intended primarily to be practiced in connection with what are commercially known as acid sludges that emanate from petroleum refineries and, therefore, are known to contain certain combustible portions and carbonaceous matter, I do not wish to be limited in this respect, because I have found that the process is equally as effective when used in conjunction with the decomposing of various acid materials where the same may contain carbonaceous or combustible portions or not.

I claim as my invention:

1. The process of disposing to the atmosphere of waste materials containing sulphuric or sulphur acids and impurities, comprising impelling the materials through a chamber and stack while excluding same from the presence of metal and in the presence of a decomposing heat and its chemical influences so as to substantially liberate the sulphur and impurities as sulphur dioxide gas and other gases, combining a diluting medium in the chamber with the gases thus liberated so as to decrease the proportions of the sulphur gas, maintaining the gases thus diluted at a temperature to substantially prevent return conversion of sulphur dioxide to sulphur trioxide and continuously discharging the gases to the atmosphere while at said temperature.

2. The process of reducing sulphuric acid bearing waste to a hot chemical gaseous form and discharging the same while hot to the atmosphere, comprising impelling the waste through a chamber and stack in the presence of a heat to evaporate the water from the acids contained in the waste and to effect decomposition and reduction of the sulphur compounds and impurities to sulphur dioxide and other gases at a heat approximately between 1600° and 2200° F., mixing a diluting medium within the chamber with the gases so as to decrease the proportions of the sulphur gas contained therein, continuing the diluted gases in motion in a direction away from the chamber, maintaining the diluted gases at a temperature to prevent reconversion of the sulphur dioxide to sulphur trioxide, and discharging the diluted gases to the atmosphere while at the last named temperature.

CHARLES HINDE.